(12) United States Patent
Nagase et al.

(10) Patent No.: US 12,316,545 B2
(45) Date of Patent: May 27, 2025

(54) CONGESTION CONTROL METHOD, CONGESTION CONTROL DEVICE, CONGESTION CONTROL PROGRAM

(71) Applicant: Nippon Telegraph and Telephone Corporation, Tokyo (JP)

(72) Inventors: Fumiaki Nagase, Musashino (JP); Keita Kuriyama, Musashino (JP); Yu Ono, Musashino (JP); Hitoshi Hasegawa, Musashino (JP); Hayato Fukuzono, Musashino (JP); Kazuo Osaka, Musashino (JP); Hiroyuki Furuya, Musashino (JP); Masafumi Yoshioka, Musashino (JP); Toshifumi Miyagi, Tokyo (JP); Takafumi Hayashi, Musashino (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 196 days.

(21) Appl. No.: 18/008,275

(22) PCT Filed: Jun. 8, 2020

(86) PCT No.: PCT/JP2020/022594
§ 371 (c)(1),
(2) Date: Dec. 5, 2022

(87) PCT Pub. No.: WO2021/250762
PCT Pub. Date: Dec. 16, 2021

(65) Prior Publication Data
US 2023/0275839 A1 Aug. 31, 2023

(51) Int. Cl.
*H04L 47/24* (2022.01)
(52) U.S. Cl.
CPC .................... *H04L 47/24* (2013.01)
(58) Field of Classification Search
CPC ...................................................... H04L 47/24
(Continued)

(56) References Cited

U.S. PATENT DOCUMENTS

| 2006/0262765 A1* | 11/2006 | Peleg | H04W 28/24 370/338 |
| 2009/0003354 A1* | 1/2009 | Sreejith | H04L 49/355 370/396 |

(Continued)

FOREIGN PATENT DOCUMENTS

JP 2019193053 10/2019

OTHER PUBLICATIONS

NTT, "Opinion on congestion countermeasures by"introduction of communication time limit"," Ministry of Internal Affairs and Communications, Information and Communications Council, Information and Communications Technology Subcommittee, IPNetwork Equipment Committee(19th), Communication Security Working Group (5th) Joint Meeting, Dec. 12, 2011, 9 pages (with English Translation).

(Continued)

*Primary Examiner* — Wing F Chan
*Assistant Examiner* — John Fan
(74) *Attorney, Agent, or Firm* — Fish & Richardson P.C.

(57) ABSTRACT

To avoid uniform deterioration of the voice quality of all the calls sharing an IP phone line at a time of congestion. The congestion control method in an IP phone system includes a call state acquisition process of acquiring the number of simultaneous call sessions in one line shared by a plurality of IP phones. A congestion control method further includes a packet loss control process of setting a priority ranking to each call session and dynamically controlling packet loss rates of the call sessions in accordance with the number of the simultaneous call sessions and the priority ranking. In the packet loss control process, the packet loss rate is set lower for call sessions ranked higher in priority, and higher for call sessions ranked lower in priority.

10 Claims, 17 Drawing Sheets

(58) Field of Classification Search
USPC .......................................................... 709/238
See application file for complete search history.

(56) References Cited

U.S. PATENT DOCUMENTS

| 2012/0281536 A1* | 11/2012 | Gell | H04W 28/06 |
| | | | 370/235 |
| 2015/0009817 A1* | 1/2015 | Sato | H04L 47/193 |
| | | | 370/230.1 |
| 2015/0117198 A1* | 4/2015 | Menezes | H04L 41/0896 |
| | | | 370/235 |
| 2021/0029005 A1 | 1/2021 | Kidokoro et al. | |

OTHER PUBLICATIONS

Suzuki et al., "Performance Analysis and Traffic Design of MCA Fleet Dispatch Communication System," Transactions of the Institute of Electronics, Information and Communication Engineers B-II, 1997, J80-B-II(1):44-53, 21 pages (with English Translation).

Tanabe et al., "Threshold Relaxation and Holding Time Limitation Method for Accepting More General Calls under Emergency Trunk Reservation," IEICE Transaction on Fundamentals of Electronics,Communications and Computer Sciences, 2016, E99-A(8):1518-1528.

* cited by examiner

Fig. 6

| | | EXAMPLES OF PACKET LOSS RATES | | | |
|---|---|---|---|---|---|
| | | NUMBER OF SIMULTANEOUS CALL SESSIONS Nsc | | | |
| | | 1 | 2 | 3 | 4 |
| PRIORITY RANKING | ① | 0 | 0 | 5 | 10 |
| | ② | | 0 | 10 | 15 |
| | ③ | | | 15 | 15 |
| | ④ | | | | 20 |

UNIT (%)

Fig. 13

<200: CALL MANAGEMENT TABLE>

| CALL ID | SOURCE ADDRESS/PORT NUMBER | DESTINATION ADDRESS/PORT NUMBER | CALL START TIME |
|---|---|---|---|
| C1 | GA.GB.GC.GD/1000 | TA.TB.TC.TD/5000 | YY/DD/HH:MM:SS |
| C2 | GE.GF.GG.GH/1200 | TE.TF.TG.TH/5200 | YY/DD/HH:MM:SS |
| C3 | GI.GJ.GK.GL/1400 | TI.TJ.TK.TL/5400 | YY/DD/HH:MM:SS |
| ... | ... | ... | ... |

Fig. 15

|  | NUMBER OF SIMULTANEOUS CALL SESSIONS Nsc | | | | | |
|---|---|---|---|---|---|---|
|  | 1 | 2 | 3 | 4 | 5 | 6 |
| ① | 0 | 0 | 0 | 20 | 40 | 50 |
| ② |  | 0 | 0 | 15 | 40 | 50 |
| ③ |  |  | 0 | 15 | 40 | 50 |
| ④ |  |  |  | 10 | 20 | 50 |
| ⑤ |  |  |  |  | 20 | 40 |
| ⑥ |  |  |  |  |  | 20 |

LONG ↑ CALL TIME ↓ SHORT

UNIT (%)

Fig. 16

COMPARATIVE EXAMPLE

| | | NUMBER OF SIMULTANEOUS CALL SESSIONS Nsc | | | | | |
|---|---|---|---|---|---|---|---|
| | | 1 | 2 | 3 | 4 | 5 | 6 |
| LONG ↑ | ① | 0 | 0 | 0 | 15 | 32 | 43.3 |
| | ② | | 0 | 0 | 15 | 32 | 43.3 |
| CALL TIME | ③ | | | 0 | 15 | 32 | 43.3 |
| | ④ | | | | 15 | 32 | 43.3 |
| | ⑤ | | | | | 32 | 43.3 |
| ↓ SHORT | ⑥ | | | | | | 43.3 |

UNIT (%)

CONGESTION CONTROL METHOD, CONGESTION CONTROL DEVICE, CONGESTION CONTROL PROGRAM

CROSS-REFERENCE TO RELATED APPLICATIONS

This application is a National Stage application under 35 U.S.C. § 371 of International Application No. PCT/JP2020/022594, having an International Filing Date of Jun. 8, 2020.

The disclosure of the prior application is considered part of the disclosure of this application, and is incorporated by reference in its entirety into this application.

TECHNICAL FIELD

The present invention relates to a technique for controlling congestion in an IP (Internet Protocol) phone system.

BACKGROUND ART

A dramatic increase in communication traffic at the time of a disaster makes it harder to ensure user access to communication services. Communication lines of important services such as police and fire-fighting become also affected. Communication service providers therefore take measures to deal with congestion in communication traffic as required. For example, minimizing the call time by limiting it only for safety confirmation is effective to reduce communication traffic. There are methods of limiting the call time of call sessions by forced disconnection for common telephones that establish communications between specific individuals (see NPL 1 and NPL 2). For MCA wireless systems, the practice of limiting the time of one call is being practiced (see NPL 3).

In the meantime, "IP phones" that use data communication (packet communication) have come to wider use (see PTL 1). In IP telephony, a line is used only when packets are sent and received, unlike a circuit-switched network of common telephones where a whole line is occupied throughout a call. Therefore IP phones allow shared use of one line by call sessions of a plurality of IP phones. Even in a congestion state, forced disconnection or call time limitation does not occur, and instead, packets in excess of the capacity of one line shared by the plurality of IP phones are dropped. Although the voice quality deteriorates by the packet loss, IP phones tend to be accessible even in a congested state. Therefore IP phones are highly expected to be a useful means of communication at times of disasters and emergencies.

CITATION LIST

Patent Literature

[PTL 1] Japanese Patent Application Publication No. 2019-193053

Non Patent Literature

[NPL 1] K. Tanabe, S. Miyata, K. Baba and K. Yamaoka, "Threshold Relaxation and Holding Time Limitation Method for Accepting More General Calls under Emergency Trunk Reservation," IEICE Transaction on Fundamentals of Electronics, Communications and Computer Sciences, pp. 1518-1528, August 2016

[NPL 2] Document "Opinions on Congestion Control by 'Introducing Limitations on Call Time'" submitted by the Nippon Telegraph and Telephone Corporation at the 5th Joint Meeting of Communication Securement Working Group (Dec. 12, 2011), the 19th IP Network Facilities Committee, Information and Communications Technology Subcommittee, Information and Communications Council, Ministry of Internal Affairs and Communications, Japan

[NPL 3] Kouzo Suzuki, Tomio Yoshida, Yasushi Mizutani, "Performance Analysis and Traffic Design of MCA Fleet Dispatch Communication System", The IEICE transactions on Electronics, B-II Vol., J80-B-II No. 1 pp. 44-53, January 1997

SUMMARY OF THE INVENTION

Technical Problem

At the time of congestion in an IP phone line, packets in excess of the capacity of one line shared by a plurality of IP phones are dropped. In conventional IP telephony, packets of all the call sessions using that line are uniformly (evenly) dropped. Accordingly, the voice quality deteriorates uniformly in all of the calls. This leads to a lower quality of experience of all the users.

An object of the present invention is to provide a technique that enables avoidance of uniform deterioration of the voice quality of all the calls sharing an IP phone line at a time of congestion.

Means for Solving the Problem

A first aspect relates to a congestion control method in an IP phone system.

The congestion control method includes:
a call state acquisition process of acquiring the number of simultaneous call sessions in one line shared by a plurality of IP phones; and a packet loss control process of setting a priority ranking to each call session and dynamically controlling packet loss rates of call sessions in accordance with the number of the simultaneous call sessions and the priority ranking.

In the packet loss control process, the higher the priority ranking is, the lower the packet loss rate is set, and the lower the priority ranking is, the higher the packet loss rate is set.

A second aspect relates to a congestion control program. The congestion control program is executed by a computer, whereby the above congestion control method is implemented. The congestion control program may be recorded in a computer-readable recording medium. The congestion control program may be provided via a network.

A third aspect relates to a congestion control apparatus in an IP phone system.

The congestion control apparatus includes an information processing apparatus.

The information processing apparatus is configured to execute
a call state acquisition process of acquiring the number of simultaneous call sessions in one line shared by a plurality of IP phones, and
a packet loss control process of setting a priority ranking to each call session and dynamically controlling packet loss rates of call sessions in accordance with the number of the simultaneous call sessions and the priority ranking.

In the packet loss control process, the information processing apparatus sets the packet loss rate such that the higher the priority ranking, the lower the packet loss rate, and the lower the priority ranking, the higher the packet loss rate.

Effects of the Invention

According to the present invention, a priority ranking is set to each call session. The packet loss rate of each call session is then dynamically controlled in accordance with the number of simultaneous call sessions and priority ranking. More particularly, the packet loss rate is set such that the higher the priority ranking, the lower the packet loss rate, and the lower the priority ranking, the higher the packet loss rate. As a result, deterioration of the voice quality is avoided in call sessions with high priority. Namely, uniform deterioration of the voice quality of all the calls is avoided.

BRIEF DESCRIPTION OF DRAWINGS

FIG. 6 is a conceptual diagram illustrating an example of settings of packet loss rates in accordance with the number of simultaneous call sessions and priority rankings in the embodiment of the present invention.

FIG. 13 is a conceptual diagram illustrating an example of a call management table according to the embodiment of the present invention.

FIG. 15 is a conceptual diagram illustrating the settings of packet loss rates used in a simulation.

FIG. 16 is a conceptual diagram illustrating the settings of packet loss rates in a comparative example.

DESCRIPTION OF EMBODIMENTS

One embodiment of the present invention will be described with reference to the accompanying drawings.

1. IP Phone System

Figure 1:
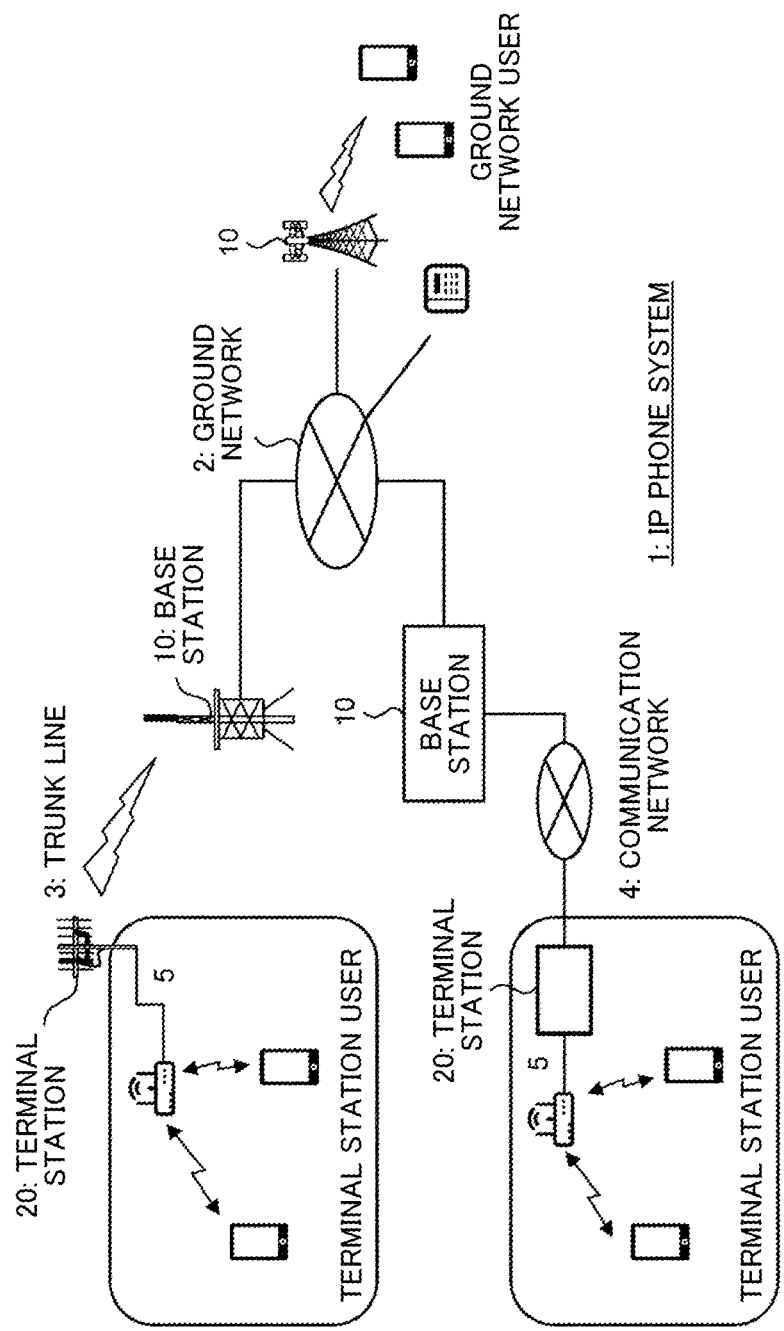
FIG. 1 is a schematic diagram illustrating a configuration example of an IP phone system according to one embodiment of the present invention.

FIG. 1 is a schematic diagram illustrating one configuration example of the IP phone system 1 according to this embodiment. The IP phone system 1 includes base stations 10 and terminal stations 20. The base stations 10 are connected to a ground network 2. For example, the terminal stations 20 are placed in local agencies related to disaster prevention, facilities related to daily lives, evacuation centers, and so on. The base stations 10 and terminal stations 20 are connected to each other by a wireless trunk line 3 or wired communication network 4. The base stations 10 and terminal stations 20 communicate with each other via the trunk line 3 or communication network 4. The terminal stations 20 are connected to terminal station networks 5. In such an IP phone system 1, for example, a user of the ground network 2 calls a user of a terminal station 20 using an IP phone. One trunk line 3 or one line in the communication network 4 is shared by a plurality of IP phones.

IP phones use UDP/IP (User Datagram Protocol/Internet Protocol) because realtimeness is desirable. Unlike TCP (Transmission Control Protocol), UDP/IP does not perform retransmissions. Therefore, when the call traffic exceeds the line capacity of the IP phone line, packets in excess of the line capacity are dropped. For example, in the IP phone system 1 illustrated in FIG. 1, when the call traffic exceeds the line capacity of the trunk line 3 or one line in the communication network 4 between the base station 10 and the terminal station 20, packets in excess of the line capacity are dropped.

Figure 2:
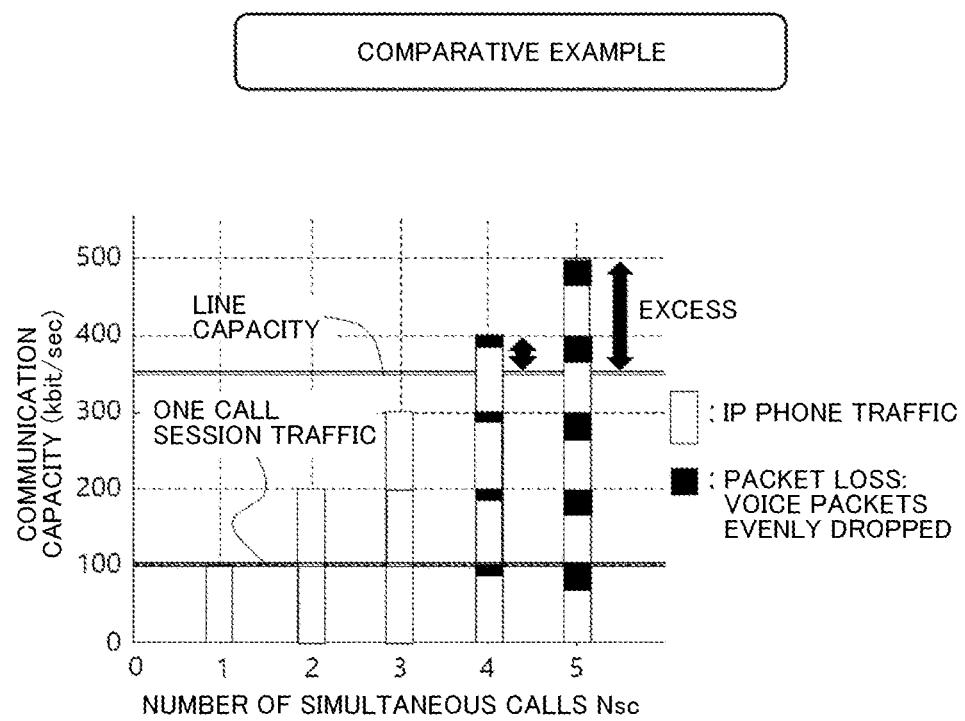
FIG. 2 is a conceptual diagram for explaining packet dropping in a comparative example.

FIG. 2 shows, as a comparative example, the relationship between the number of simultaneous call sessions Nsc and packet losses in the conventional IP telephony. The number of simultaneous call sessions Nsc is the number of call sessions that are using one IP phone line at the same time. For example, the number of simultaneous call sessions Nsc is the number of call sessions simultaneously established at a certain time in the trunk line 3 or one line in the communication network 4 between the base station 10 and the terminal station 20. When the number of simultaneous call sessions Nsc increases and the call traffic exceeds the line capacity, packets are dropped in all the call sessions uniformly (evenly). The packet loss rate Pl in this comparative example is expressed by the following formula (1) if the loss rate of packets being transferred in the trunk line 3 or communication network 4 is zero.

$$\text{Packet loss rate } Pl = 1 - (\text{Line Capacity}/\text{Total Call Traffic}) \qquad \text{Formula (1):}$$

Let us assume that the line capacity is 340 kbit/s and one call generates a traffic of 100 kbit/s. If the number of simultaneous call sessions Nsc is 3 or less, the packet loss rate Pl is 0. If the number of simultaneous call sessions Nsc is 4, the packet loss rate Pl is 15%. Since packets are dropped uniformly in all the call sessions, the voice quality deteriorates evenly. This leads to a lower quality of experience of all the users.

Accordingly, this embodiment provides a technique that enables avoidance of uniform deterioration of the voice quality of all the calls in an IP phone line at a time of congestion.

2. Congestion Control Apparatus

The IP phone system 1 according to the embodiment further includes a "congestion control apparatus 100". The congestion control apparatus 100 controls congestion in an IP phone line of the IP phone system 1. The congestion control apparatus 100 is placed in association with a station that handles call traffic, which is the amount of communications between IP phones, and controls the amount of communications (e.g., base station 10, terminal station 20).

Figure 3:
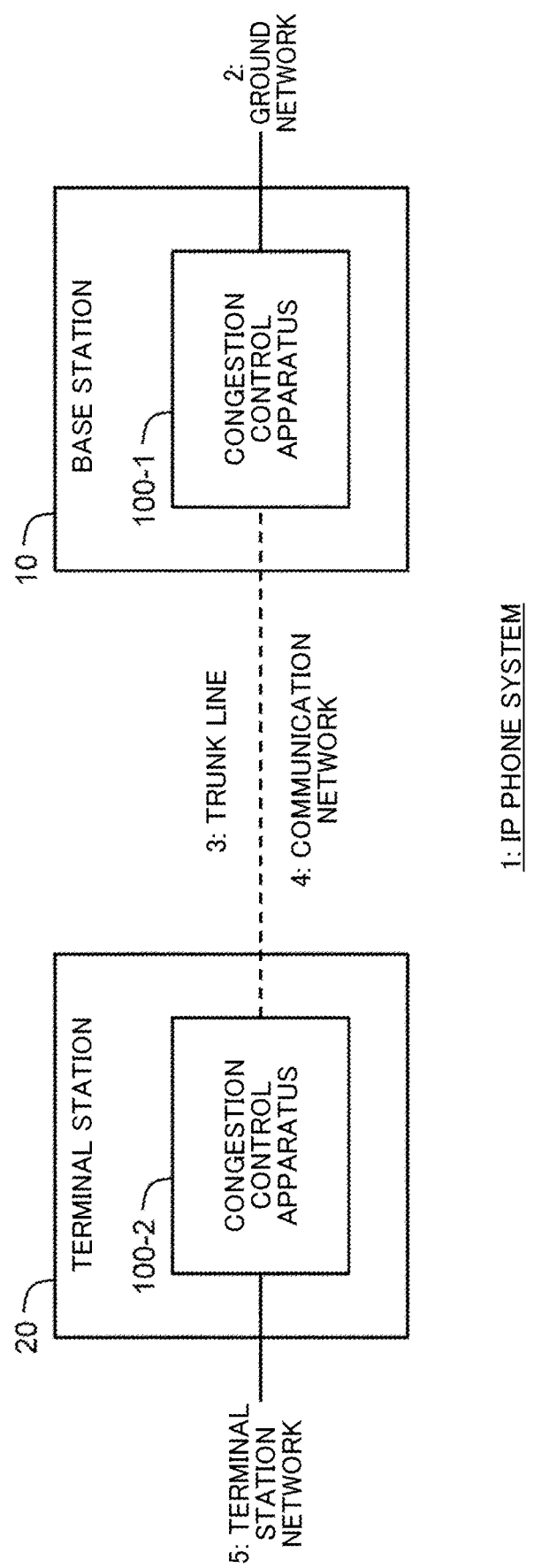
FIG. 3 is a block diagram illustrating an example of placement of congestion control apparatuses according to the embodiment of the present invention.

FIG. 3 is a block diagram illustrating an example of placement of congestion control apparatuses 100. In the example shown in FIG. 3, a congestion control apparatus 100-1 is placed inside a base station 10, and a congestion control apparatus 100-2 is placed inside a terminal station 20. The congestion control apparatuses 100-1 and 100-2 each control congestion in an IP phone line (trunk line 3 or communication network 4) between the base station 10 and the terminal station 20.

Figure 4:
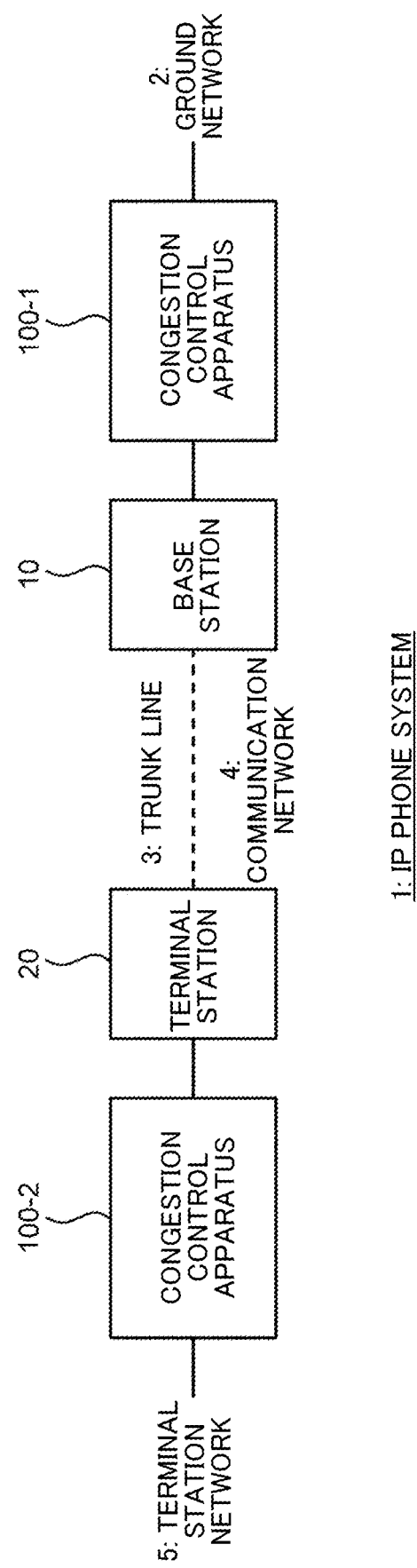
FIG. 4 is a block diagram illustrating another example of placement of congestion control apparatuses according to the embodiment of the present invention.

FIG. 4 is a block diagram illustrating another example of placement of congestion control apparatuses 100. In the example shown in FIG. 4, a congestion control apparatus 100-1 is placed between a base station 10 and a ground network 2, and a congestion control apparatus 100-2 is placed between a terminal station 20 and a "user of the terminal station 20". In this case, too, the congestion control apparatuses 100-1 and 100-2 can each control congestion in an IP phone line (trunk line 3 or communication network 4) between the base station 10 and the terminal station 20.

The congestion control apparatuses 100-1 and 100-2 are placed in association with the base station 10 and terminal station 20, respectively, so as to control the traffic transmitted from the base station 10 and terminal station 20 to the trunk line 3 or communication network 4.

Hereinafter, characteristic features of the processing by the congestion control apparatus 100 according to the embodiment will be described.

2-1. Packet Loss Control in Consideration of Priority

According to this embodiment, the packet loss rate Pl of voice packets is dynamically controlled (set) for each of the call sessions during a congestion. For this purpose the congestion control apparatus 100 sets a priority ranking to each call session. The congestion control apparatus 100 dynamically controls the packet loss rate Pl of voice packets of each call session in accordance with the number of simultaneous call sessions Nsc and priority ranking.

Figure 5:
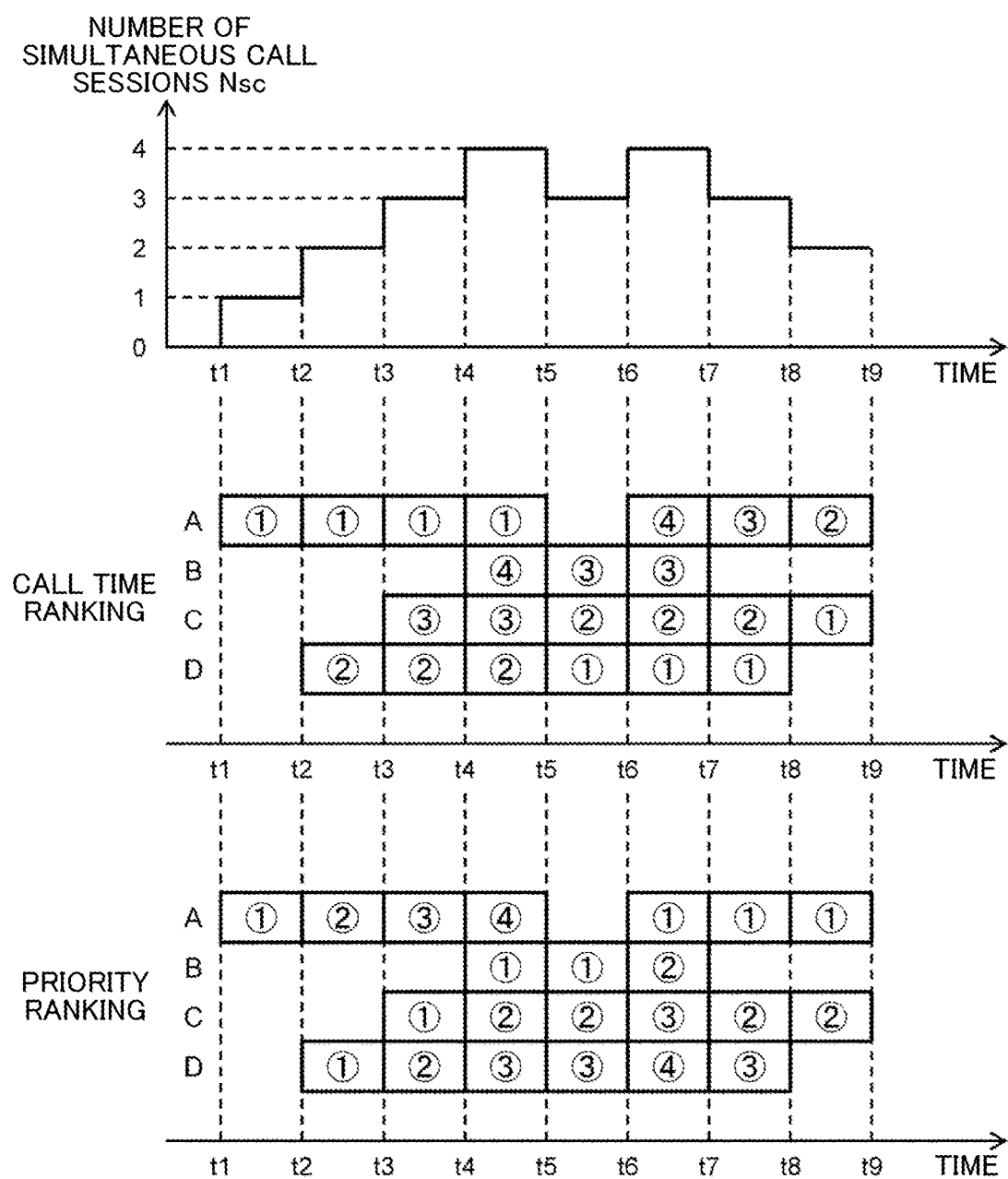
FIG. 5 is a conceptual diagram for explaining an example of priority ranking in the embodiment of the present invention.

FIG. 5 is a conceptual diagram for explaining an example of priority ranking. FIG. 5 shows the respective call states of a plurality of users A, B, C, and D, and the changes in the number of simultaneous call sessions Nsc. At time t1, a user A starts a call (Nsc=1). At time t2, a user D starts a call (Nsc=2). At time t3, a user C starts a call (Nsc=3). At time t4, a user B starts a call (Nsc=4). At time t5, the user A ends the call (Nsc=3). At time t6, the user A starts a call (Nsc=4). At time t7, the user B ends the call (Nsc=3). At time t8, the user D ends the call.

The encircled numbers in the mid row in FIG. 5 indicate call time rankings of the respective call sessions (users). The smaller the encircled number, the higher the call time ranking, i.e., the longer the call time.

The encircled numbers in the lower row in FIG. 5 indicate priority rankings of the respective call sessions (users). The smaller the encircled number, the higher the priority. In the example shown in FIG. 5, the priority is set such that the shorter the call time, the higher the priority, and the longer the call time, the lower the priority.

In another example, the priority of an emergency call to the police or fire station may be set higher than those of other general calls.

FIG. 6 is a conceptual diagram illustrating an example of settings of packet loss rates Pl in accordance with the number of simultaneous call sessions Nsc and priority rankings. If the number of simultaneous call sessions Nsc is 1 or 2, no packets are dropped in each call session (packet loss rate Pl=0%). If the number of simultaneous call sessions Nsc is 3 or 4, the packet loss rate Pl is set to a value higher than 0% and lower than 100%, i.e., some packets are dropped. In particular, according to this embodiment, the higher the priority, the lower the packet loss rate Pl is set, and the lower the priority, the higher the packet loss rate Pl is set. Namely, the packet loss rate Pl is set for each call session in accordance with the priority ranking, and not uniformly (evenly) for all the call sessions.

Hereinafter, for the sake of convenience, the range of the number of simultaneous call sessions Nsc for which a packet loss rate Pl is set in consideration of priority ranking shall be referred to as "first range RNG". The lower limit of the first range RNG is for example a number that allows calls without packet loss and without the control according to this embodiment, a number that allows IP calls to make maximum use of the line capacity. For example, the lower limit of the first range RNG is a smallest integer larger than "line capacity/one call traffic". As another example, the first range RNG may be a predetermined constant. The upper limit of the first range RNG is a value larger than the lower limit. In the example shown in FIG. 6, the lower limit of the first range RNG is 3 and the upper limit is 4.

The first range RNG may also be considered as a concept of a range in which the packet loss rate Pl is set to 0%. For example, in the example shown in FIG. 6, the first range RNG of the number of simultaneous call sessions Nsc may be 1 to 4. If the number of simultaneous call sessions Nsc is 1 or 2, the packet loss rate Pl is 0%, and the results will be the same.

According to this embodiment, the congestion control apparatus 100 sets a priority ranking to each call session this way. The congestion control apparatus 100 then dynamically controls the packet loss rate Pl of each call session in accordance with the number of simultaneous call sessions Nsc and priority ranking. More particularly, the congestion control apparatus 100 sets the packet loss rate such that the higher the priority ranking, the lower the packet loss rate Pl, and the lower the priority ranking, the higher the packet loss rate Pl. As a result, deterioration of the voice quality is avoided in call sessions with high priority. Unlike the case of the comparative example (FIG. 2), the voice quality does not deteriorate uniformly in all the calls. Therefore the quality of experience of users as a whole will improve.

The priority ranking may be set such as to decrease as the call time increases. In this case, the longer the call time, the more the packet loss rate Pl increases, which lowers the voice quality. The lowered voice quality is expected to encourage the user to end the call. Namely, the longer the call time, the more likely it is that the user ends the call. Ending long calls will free up the line resources and improves the voice quality of other users' calls. Another advantage of the congestion control is that the call loss probability will decrease because new calls from users are more likely to be accepted.

The lowered voice quality in the case of a long call does not always cause an issue because the necessary information will likely have already been conveyed. It is more preferable, during the time of congestion, to free up the line resources for short call users and new users. For example, at the time of a disaster, it is imaginable that a large number of users will just want to confirm each other's safety. For a short call the voice quality will not deteriorate so that important information such as safety confirmation can be conveyed favorably. After that, as the call carries on and the voice quality lowers, this call is expected to be ended. Hence the advantage of the congestion control that this allows a new user to start a call more easily.

2-2. Limitation on the Number of Simultaneous Call Sessions

The congestion control apparatus 100 may limit the number of simultaneous call sessions Nsc to not exceed a predetermined number. Typically, this predetermined number is the upper limit of the first range RNG mentioned above. The upper limit of the number of simultaneous call sessions Nsc will be hereinafter referred to as "upper limit Nlim".

Figure 7:
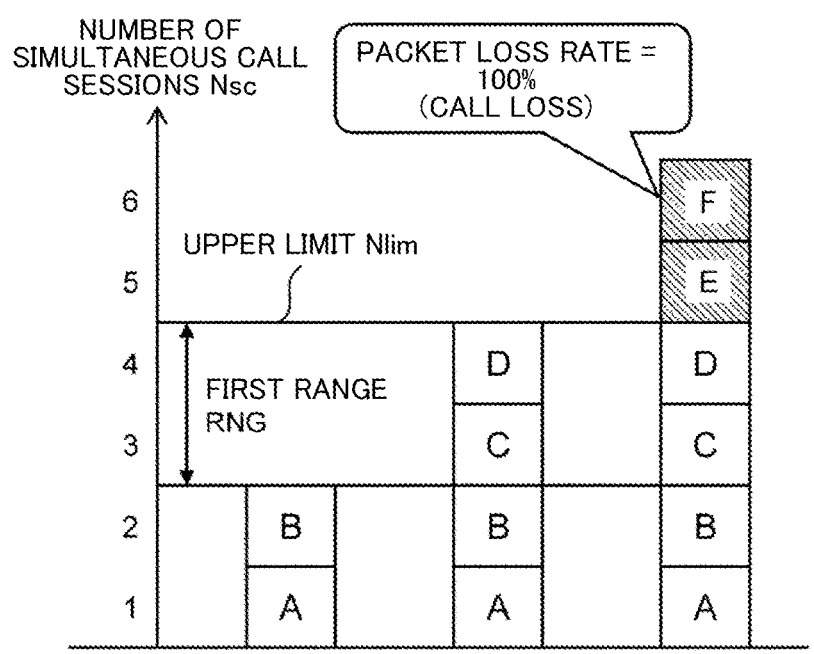
FIG. 7 is a conceptual diagram for explaining the limiting of the number of simultaneous call sessions in the embodiment of the present invention.

FIG. 7 is a conceptual diagram for explaining the limiting of the number of simultaneous call sessions Nsc. When the number of simultaneous call sessions Nsc exceeds the upper limit Nlim by establishment of a new call session, the congestion control apparatus 100 sets the packet loss rate Pl of that new call session to 100%. The packet loss rate Pl being 100% practically means a call loss. Namely, the congestion control apparatus 100 causes calls in excess of the upper limit Nlim to be lost. This limits the number of simultaneous call sessions Nsc to the upper limit Nlim or less.

In the example shown in FIG. 7, the lower limit and upper limit of the first range RNG are 3 and 4, respectively, and therefore the upper limit Nlim is 4. If the users A, B, C, and D make calls simultaneously, the number of simultaneous call sessions Nsc will reach the upper limit Nlim. If other users E and F attempt to make new calls, these calls will be lost. Thus the number of simultaneous call sessions Nsc is limited to the upper limit Nlim or less.

Limiting the number of simultaneous call sessions Nsc not to exceed the upper limit Nlim can prevent severe deterioration of the voice quality, and allows a certain level or more of voice quality to be secured.

2-3. Process Flow

Figure 8:
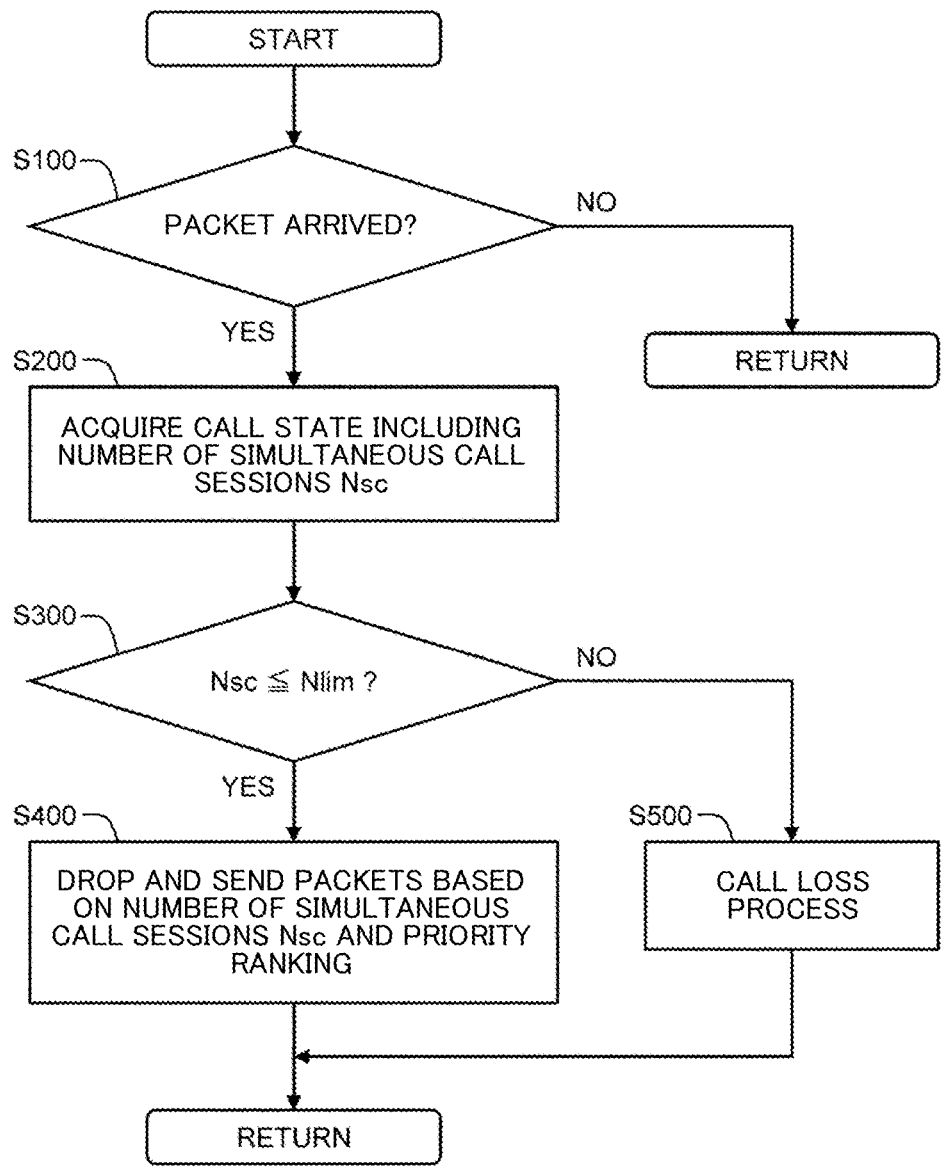
FIG. 8 is a flowchart concisely illustrating the processing performed by the congestion control apparatus according to the embodiment of the present invention.

FIG. 8 is a flowchart concisely illustrating the processing performed by the congestion control apparatus 100 according to this embodiment.

At step S100, the congestion control apparatus 100 determines whether or not a packet has arrived. When a packet has arrived (step S100: Yes), the process proceeds to step S200.

At step S200, the congestion control apparatus 100 executes a "call state acquisition process" of acquiring a call state. The call state at least includes the number of simultaneous call sessions Nsc in an IP phone line monitored by the congestion control apparatus 100. The call state may further include the call time of each call session. After that, the process proceeds to step S300.

At step S300, the congestion control apparatus 100 determines whether or not the number of simultaneous call sessions Nsc is equal to or less than the upper limit Nlim. If the number of simultaneous call sessions Nsc is equal to or less than the upper limit Nlim (step S300: Yes), the process proceeds to step S400. On the other hand, if the number of simultaneous call sessions Nsc is more than the upper limit Nlim (step S300: No), the process proceeds to step S500.

At step S400, the congestion control apparatus 100 executes a "packet loss control process". Specifically, the congestion control apparatus 100 sends out packets while dynamically controlling the packet loss rate Pl in accordance with the number of simultaneous call sessions Nsc and priority ranking. The packet loss rate Pl is 0% by default.

Figure 9:
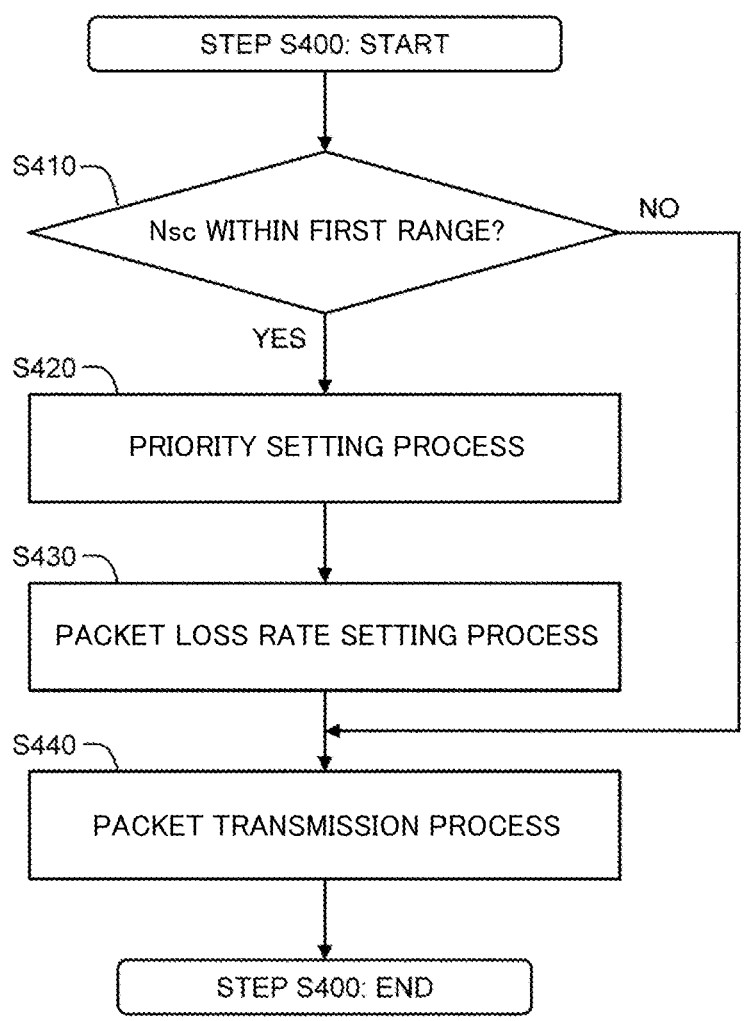
FIG. 9 is a flowchart illustrating step S400 in FIG. 8.

FIG. 9 is a flowchart illustrating step S400.

At step S410, the congestion control apparatus 100 determines whether or not the number of simultaneous call sessions Nsc is within the first range RNG. If the number of simultaneous call sessions Nsc is within the first range RNG (step S410: Yes), the process proceeds to step S420. On the other hand, if the number of simultaneous call sessions Nsc is outside the first range RNG (step S410: No), the process proceeds to step S440.

At step S420, the congestion control apparatus 100 executes a "priority setting process" in which it sets a priority ranking to each call session. For example, the congestion control apparatus 100 sets a priority ranking of each call session based on the call time of each call session acquired at step S200. In this case, the congestion control apparatus 100 ranks shorter calls higher in priority, and ranks longer calls lower in priority. After that, the process proceeds to step S430.

At step S430, the congestion control apparatus 100 executes a "packet loss rate setting process" of setting the packet loss rate Pl. Specifically, the congestion control apparatus 100 sets the packet loss rate Pl in accordance with the number of simultaneous call sessions Nsc and priority ranking (see FIG. 6). In this process, the packet loss rate Pl is set such the higher the priority ranking, the lower the packet loss rate Pl, and the lower the priority ranking, the higher the packet loss rate Pl. After that, the process proceeds to step S440.

At step S440, the congestion control apparatus 100 executes a "packet transmission process" of sending packets to destinations. In this process, the congestion control apparatus 100 sends the packets that were not dropped, while some packets are dropped as required in accordance with the packet loss rates Pl.

At step S500, the congestion control apparatus 100 executes a "call loss process". Specifically, the congestion control apparatus 100 sets the packet loss rate Pl of new call sessions in excess of the upper limit Nlim to 100% so that the packets will be dropped. Namely, the congestion control apparatus 100 practically causes calls in excess of the upper limit Nlim to be lost. This limits the number of simultaneous call sessions Nsc to the upper limit Nlim or less.

These processes performed by the congestion control apparatus 100 described above provide the advantageous effects mentioned above. Namely, the packet loss control process (step S400) prevents uniform deterioration of the voice quality of all the calls. Moreover, the call loss probability will be lowered. The call loss process (step S500) can prevent severe deterioration of voice quality.

2-4. Variation Example

Figure 10:
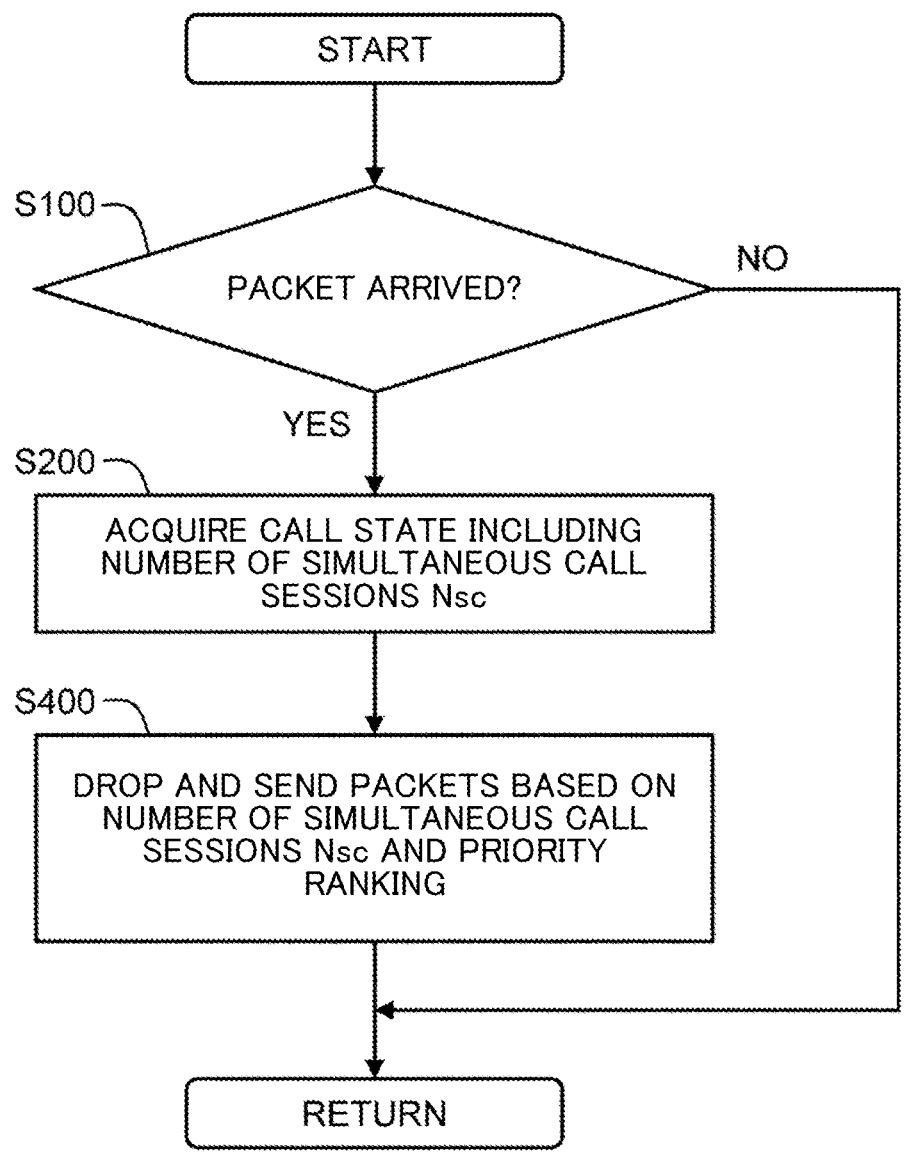
FIG. 10 is a flowchart illustrating the processing performed by the congestion control apparatus according to a variation example.

FIG. 10 is a flowchart illustrating the processing according to a variation example. In this variation example, step S300 and step S500 are omitted. This variation example can also provide at least the advantageous effect by the packet loss control process (step S400).

3. Configuration Example of Congestion Control Apparatus

Figure 11:
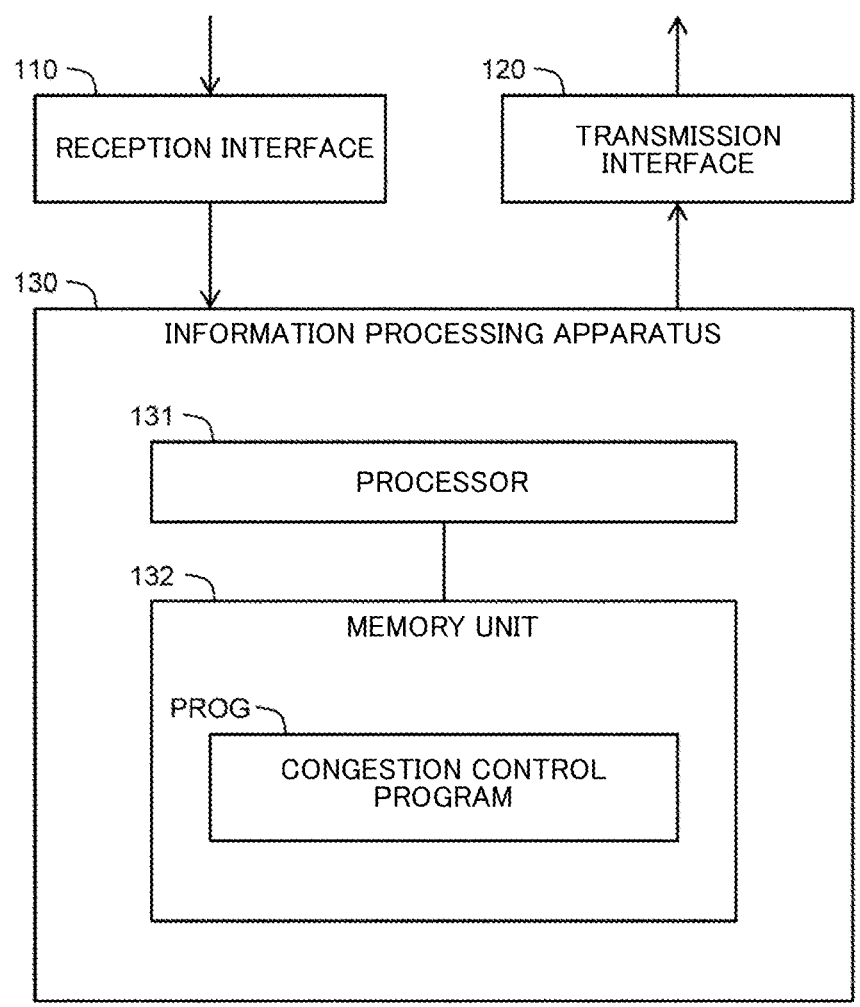
FIG. 11 is a block diagram illustrating a configuration example of the congestion control apparatus according to the embodiment of the present invention.

FIG. 11 is a block diagram illustrating a configuration example of the congestion control apparatus 100 according to the embodiment. The congestion control apparatus 100 includes a reception interface 110, a transmission interface 120, and an information processing apparatus 130. The reception interface 110 receives packets from outside. The transmission interface 120 sends packets to outside.

The information processing apparatus 130 carries out various information processing. For example, the information processing apparatus 130 includes a processor 131 and a memory unit 132. The processor 131 carries out various information processing. For example, the processor 131 includes a CPU (Central Processing Unit). The memory unit 132 stores various information necessary for the processing performed by the processor 131. Examples of the memory unit 132 include a volatile memory, non-volatile memory, HDD (Hard Disk Drive), SSD (Solid State Drive), and so on.

The congestion control program PROG is a computer program executed by a computer. The processor 131 implements the functions of the information processing apparatus 130 by executing the congestion control program PROG. The congestion control program PROG is stored in the memory unit 132. The congestion control program PROG may be recorded in a computer-readable recording medium. The congestion control program PROG may be provided via a network.

The information processing apparatus 130 may be implemented using hardware such as an ASIC (Application Specific Integrated Circuit), PLD (Programmable Logic Device), FPGA (Field Programmable Gate Array), and so on.

Figure 12:
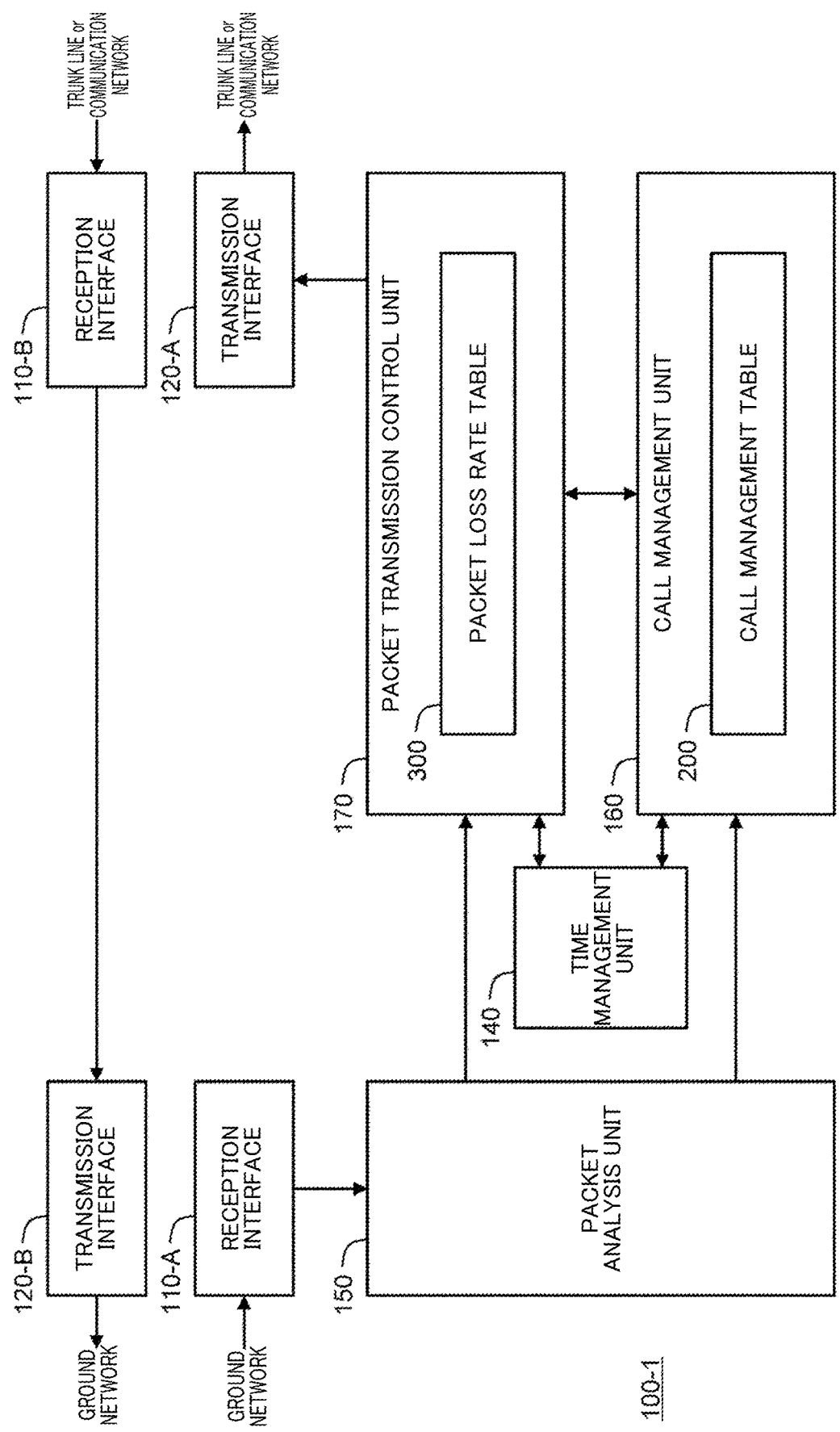
FIG. 12 is a block diagram illustrating a functional configuration example of the congestion control apparatus in a base station according to the embodiment of the present invention.

FIG. 12 is a block diagram illustrating a functional configuration example of the congestion control apparatus 100-1 in a base station 10. The congestion control apparatus 100-1 includes a reception interface 110-A, a transmission interface 120-A, a reception interface 110-B, and a transmission interface 120-B. The reception interface 110-A receives packets from a ground network 2. The transmission interface 120-A sends packets to a trunk line 3 or communication network 4. The reception interface 110-B receives packets from a trunk line 3 or communication network 4. The transmission interface 120-B sends packets to a ground network 2.

The congestion control apparatus 100-1 further includes a time management unit 140, a packet analysis unit 150, a call management unit 160, and a packet transmission control unit 170. These time management unit 140, packet analysis unit 150, call management unit 160, and packet transmission control unit 170 are implemented by the information processing apparatus 130.

The time management unit 140 manages the current time.

The packet analysis unit 150 receives the received packets from the reception interface 110-A. The packet analysis unit 150 analyzes the received packets and acquires information on the received packets. Specifically, the packet analysis unit 150 acquires source addresses, source port numbers, destination addresses, and destination port numbers of the received packets. The packet analysis unit 150 also determines which of the start of a call, end of a call, or others the received packets represent. The packet analysis unit 150 notifies the call management unit 160 of analysis results information that indicates source addresses, source port numbers, destination addresses, destination port numbers, and classification (start of a call, end of a call, or others). The packet analysis unit 150 also sends the received packets to the packet transmission control unit 170.

The call management unit 160 manages each of the calls handled by the congestion control apparatus 100. Each call is defined by a combination of a source address, source port number, destination address, and destination port number. The call management unit 160 receives analysis results information from the packet analysis unit 150, and generates and updates the call management table 200 based on the analysis results information.

FIG. 13 is a conceptual diagram illustrating an example of the call management table 200. The call management table 200 has entries for respective call sessions. Each entry includes a call ID, source address, source port number, destination address, destination port number, and call start time.

When the analysis results information indicates "start of a call," the call management unit 160 creates an entry for a new call session. The combination of a source address, source port number, destination address, and destination port number for the new call session is obtained from the analysis results information. The call management unit 160 assigns a call ID to the new call session. Further, the call management unit 160 sends a query to the time management unit 140 for the current time. The time management unit 140 notifies the call management unit 160 of the current time. The call management unit 160 sets the obtained current time to the call start time of the new call session.

When the analysis results information indicates "end of a call," the call management unit 160 deletes the entry for this call session.

The packet transmission control unit 170 receives the received packets from the packet analysis unit 150. The packet transmission control unit 170 executes the processing described above and illustrated in FIG. 8 and FIG. 9 to the received packets.

Specifically, the packet transmission control unit 170 sends queries to the call management unit 160 for the number of simultaneous call sessions Nsc and the call start times of respective call sessions. The call management unit 160 looks up the call management table 200 and acquires the number of simultaneous call sessions Nsc and the call start times of respective call sessions. The call management unit 160 then notifies the packet transmission control unit 170 of the number of simultaneous call sessions Nsc and the call start times of respective call sessions. Further, the packet transmission control unit 170 sends a query to the time management unit 140 for the current time. The time management unit 140 notifies the packet transmission control unit 170 of the current time. The packet transmission control unit 170 calculates call times from the current time and the call start times. This way, the packet transmission control unit 170 acquires call states including the number of simultaneous call sessions Nsc and call times of respective call sessions (step S200).

If the number of simultaneous call sessions Nsc is equal to or less than the upper limit Nlim (step S300: Yes), the packet transmission control unit 170 drops packets and sends out packets in accordance with the packet loss rate corresponding to the number of simultaneous call sessions Nsc and priority ranking (step S400). The priority is set based on the call time in this example such as to decrease as the call time increases (step S420).

The packet transmission control unit 170 has a packet loss rate table 300. The packet loss rate table 300 shows packet loss rates Pl based on relationships between numbers of simultaneous call sessions Nsc and priority rankings, as has been shown in FIG. 6. The packet transmission control unit 170 looks up the packet loss rate table 300, and sets the packet loss rate Pl corresponding to the number of simultaneous call sessions Nsc and priority ranking (step S430).

The packet transmission control unit 170 drops packets as required in accordance with the packet loss rate Pl. The packet transmission control unit 170 then sends the packets that were not dropped via the transmission interface 120-A (step S440).

If the number of simultaneous call sessions Nsc is more than the upper limit Nlim (step S300: No), the packet transmission control unit 170 executes a call loss process (step S500). Specifically, the packet transmission control unit 170 sets the packet loss rate Pl of new call sessions in excess of the upper limit Nlim to 100% and drops the packets. The packet transmission control unit 170 then notifies the call management unit 160 that the call loss process was executed to the new call sessions. The call management unit 160 deletes the entries for the new call sessions from the call management table 200.

Figure 14:
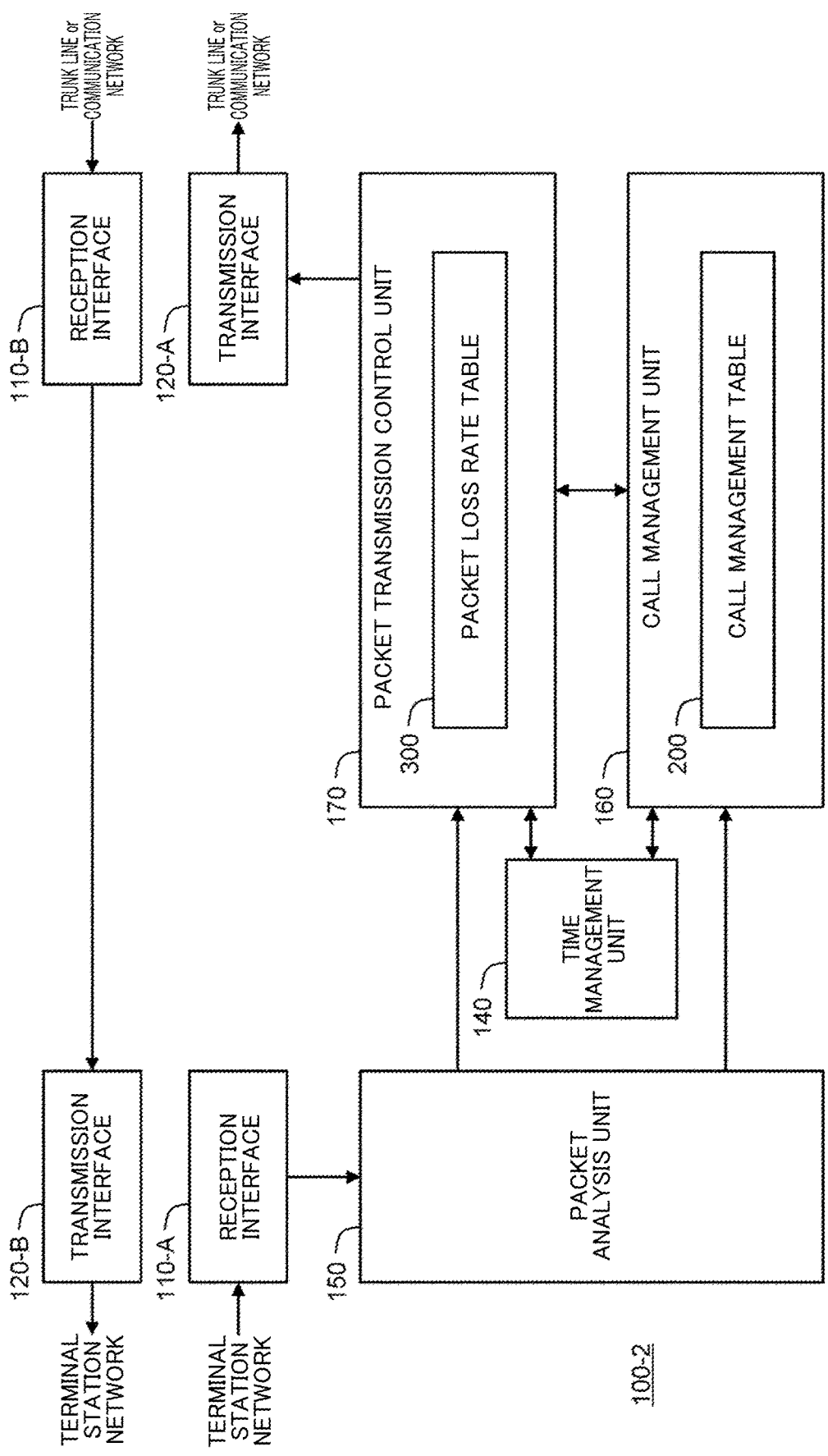
FIG. 14 is a block diagram illustrating a functional configuration example of the congestion control apparatus in a terminal station according to the embodiment of the present invention.

FIG. 14 is a block diagram illustrating a functional configuration example of the congestion control apparatus 100-2 in a terminal station 20. The congestion control apparatus 100-2 has the same configuration as that of the congestion control apparatus 100-1 illustrated in FIG. 12. The difference is that the reception interface 110-A receives packets from the terminal station network 5 while the transmission interface 120-B sends packets to the terminal station network 5. The time management unit 140, packet analysis unit 150, call management unit 160, and packet transmission control unit 170 function similarly to those of the congestion control apparatus 100-1 illustrated in FIG. 12.

4. Simulation Results

The present inventors performed a simulation for quantitative estimation of the effects of this embodiment. In this simulation, it was assumed that the line capacity was 340 kbit/s and one call session of an IP phone required a bandwidth of 100 kbit/s. When the number of simultaneous call sessions Nsc is 3 or less, the voice quality does not deteriorate and no packets are dropped. When the number of simultaneous call sessions Nsc is 4 or more, some packets are dropped.

FIG. 15 illustrates the settings of packet loss rates Pl used in the simulation. The upper limit Nlim of the number of simultaneous call sessions Nsc is 6. The packet loss rate Pl is set low for short calls.

FIG. 16 illustrates the settings of packet loss rates Pl in a comparative example. In the comparative example, when the call traffic exceeds the line capacity, packets are dropped uniformly in all the call sessions. The packet loss rate Pl in the case of the comparative example is given by the above formula (1).

In the simulation, the call occurrences and call (end) times were at random, and the call end rate p was given by the following formula (2). Namely, it was assumed that the call end rate μ of call sessions would increase proportionally to the square of the packet loss rate Pl. The call end rate $\mu_0$ when the packet loss rate Pl is 0% was assumed to be 0.111 (%/sec), i.e., the average call time ($1/\mu_0$) was assumed to be 900 seconds.

$$\mu = \mu_0 \times \left(\frac{1}{1-Pl}\right)^2 \qquad (2)$$

The number of users of terminal stations 20 was set to 50. The call loss probability relative to the offered traffic was calculated while varying the calling rate.

Figure 17:
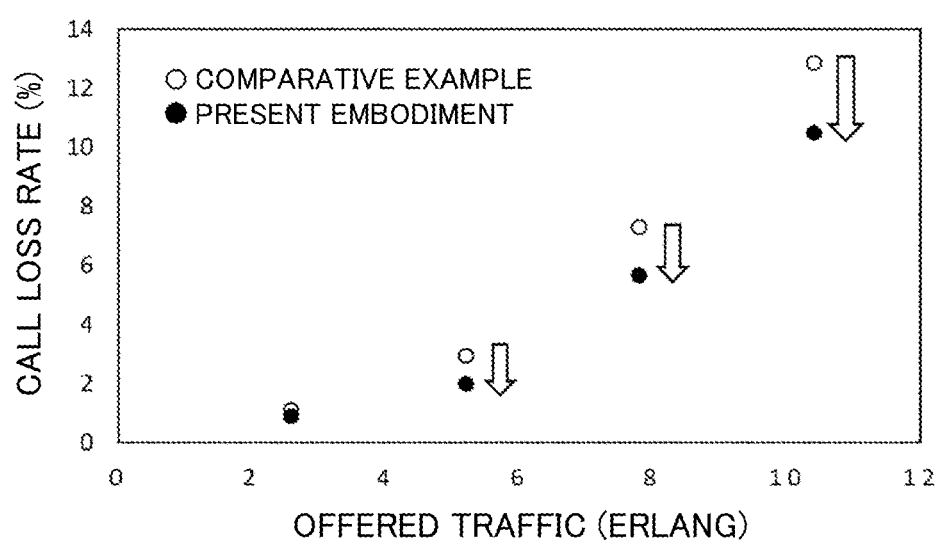
FIG. 17 is a graph illustrating a simulation result.

FIG. 17 is a graph illustrating the simulation result. The horizontal axis represents the offered traffic (erlang) and the vertical axis represents the call loss probability (%). FIG. 17 indicates that the call loss probability reduces in the case of this embodiment as compared to the comparable example. For example, when the offered traffic is 10.4 erlang, the call loss probability is 12.8% in the comparative example, while the call loss probability in this embodiment is 10.4%. As demonstrated, this embodiment provides the effect of reducing the call loss probability.

5. Other Processing Examples in Consideration of Priority

The congestion control apparatus 100 may execute the following processing for call sessions with lower priority.

<Example 1> The congestion control apparatus 100 may reduce the transfer capacity using a codec with a high compression rate for call sessions with low priority.

<Example 2> The congestion control apparatus 100 may reduce the transfer capacity by delaying the order of sending packets to increase the delay time for call sessions with low priority.

<Example 3> The congestion control apparatus 100 may lower the transmission rate of call sessions with low priority by changing the transmission control protocol to TCP and reducing the window size.

<Example 4> The congestion control apparatus 100 may shorten the line usage time of call sessions with low priority by multiplexing the modulation method.

<Example 5> The congestion control apparatus 100 may sort the bandwidths into a "dedicated bandwidth" and a "shared bandwidth" shared by a plurality of calls sessions, and assign the dedicated bandwidth to call sessions with higher priority and the shared bandwidth to call sessions with lower priority.

REFERENCE SIGNS LIST

1 IP phone system
2 Ground network
3 Trunk line
4 Communication network
5 Terminal station network
10 Base station
20 Terminal station
100 Congestion control apparatus
110 Reception interface
120 Transmission interface
130 Information processing apparatus
131 Processor
132 Memory unit
140 Time management unit
150 Packet analysis unit
160 Call management unit
170 Packet transmission control unit
200 Call management table
300 Packet loss rate table
PROG Congestion control program

The invention claimed is:

1. A congestion control method in an Internet Protocol (IP) phone system, comprising:
    acquiring a number of simultaneous call sessions in one line shared by a plurality of IP phones;
    acquiring a call time of each call session;
    setting a priority ranking of each call session based on the call time of each call session, wherein the longer the call time is, the lower the priority ranking is set, and the shorter the call time is, the higher the priority ranking is set; and
    dynamically controlling packet loss rates of the call sessions in accordance with the number of the simultaneous call sessions and the priority ranking,
    wherein the higher the priority ranking is, the lower the packet loss rate is set, and the lower the priority ranking is, the higher the packet loss rate is set.

2. The congestion control method according to claim 1, further comprising
when establishment of a new call session causes the number of simultaneous call sessions to exceed a predetermined upper limit, setting the packet loss rate of the new call session to 100%.

3. The congestion control method according to claim 1, wherein
the IP phone system includes a base station and a terminal station that communicates with the base station, and
the one line is a line between the base station and the terminal station.

4. A non-transitory computer readable medium storing one or more instructions causing a computer in an Internet Protocol (IP) phone system to execute:
acquiring a number of simultaneous call sessions in one line shared by a plurality of IP phones;
acquiring a call time of each call session;
setting a priority ranking of each call session based on the call time of each call session, wherein the longer the call time is, the lower the priority ranking is set, and the shorter the call time is, the higher the priority ranking is set; and
dynamically controlling packet loss rates of the call sessions in accordance with the number of the simultaneous call sessions and the priority ranking,
wherein the higher the priority ranking is, the lower the packet loss rate is set, and the lower the priority ranking is, the higher the packet loss rate is set.

5. A congestion control apparatus in an Internet Protocol (IP) phone system, comprising
an information processing apparatus,
the information processing apparatus being configured to execute:
acquiring a number of simultaneous call sessions in one line shared by a plurality of IP phones;
acquiring a call time of each call session;
setting a priority ranking of each call session based on the call time of each call session, wherein the longer the call time is, the lower the priority ranking is set, and the shorter the call time is, the higher the priority ranking is set; and
dynamically controlling packet loss rates of the call sessions in accordance with the number of the simultaneous call sessions and the priority ranking,
wherein the information processing apparatus sets the packet loss rate such that the higher the priority ranking is, the lower the packet loss rate is set, and the lower the priority ranking is, the higher the packet loss rate is set.

6. The congestion control apparatus according to claim 5, wherein
the information processing apparatus is further configured to execute: when establishment of a new call session causes the number of simultaneous call sessions to exceed a predetermined upper limit, set the packet loss rate of the new call session to 100%.

7. The non-transitory computer readable medium according to claim 4, wherein the one or more instructions cause the computer to execute:
when establishment of a new call session causes the number of simultaneous call sessions to exceed a predetermined upper limit, setting the packet loss rate of the new call session to 100%.

8. The non-transitory computer readable medium according to claim 4, wherein
the IP phone system includes a base station and a terminal station that communicates with the base station, and
the one line is a line between the base station and the terminal station.

9. The congestion control apparatus according to claim 5, wherein
the IP phone system includes a base station and a terminal station that communicates with the base station, and
the one line is a line between the base station and the terminal station.

10. The congestion control method according to claim 1, wherein
in response to the number of the simultaneous call sessions being less than a first predetermined value, setting the packet loss rate of each call session to be 0%; and
in response to the number of the simultaneous call sessions being greater than the first predetermined value and less than a second predetermined value, setting the packet loss rate of each call session to be between 0% and 100%.

* * * * *